Figure 1:
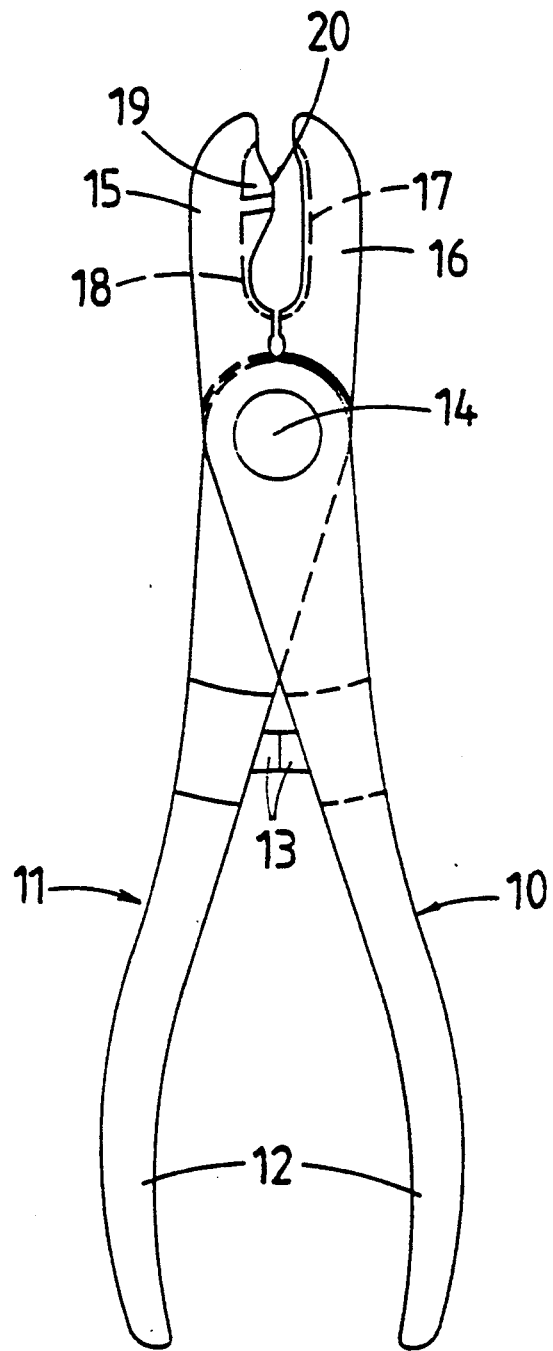

United States Patent [19]
van Amelsfort

[11] Patent Number: 5,141,514
[45] Date of Patent: Aug. 25, 1992

[54] EAR TAG APPLICATOR

[75] Inventor: Petrus A. B. van Amelsfort, Ashhurst, New Zealand

[73] Assignee: Allflex New Zealand Ltd., Palmerston North, New Zealand

[21] Appl. No.: 701,098

[22] Filed: May 16, 1991

[30] Foreign Application Priority Data

May 18, 1990 [NZ] New Zealand .................. 233737

[51] Int. Cl.$^5$ ............................................. A61B 17/00
[52] U.S. Cl. .................................... 606/117; 606/116; 606/142
[58] Field of Search ............... 606/117, 116, 120, 216, 606/219, 220, 139, 140, 141, 142, 143; 40/301

[56] References Cited

U.S. PATENT DOCUMENTS

| | | | |
|---|---|---|---|
| 154,046 | 8/1874 | Hill | 606/117 X |
| 352,245 | 11/1886 | Hullhorst | 606/120 X |
| 1,863,037 | 6/1932 | Archbold | 606/117 X |
| 2,635,238 | 4/1953 | Garland | 606/120 X |
| 4,281,657 | 8/1981 | Ritchey | 606/117 |
| 4,943,294 | 7/1990 | Knapp | 606/117 |

FOREIGN PATENT DOCUMENTS

| | | | |
|---|---|---|---|
| 561 | 6/1896 | Denmark | 606/117 |
| 213876 | 10/1909 | Fed. Rep. of Germany | 606/117 |
| 2114045 | 8/1983 | United Kingdom | 606/117 |

Primary Examiner—Peter A. Aschenbrenner
Attorney, Agent, or Firm—Blakely, Sokoloff, Taylor & Zafman

[57] ABSTRACT

An ear tag applicator tool for applying a tag of the type having a portion which is able to be passed through an opening in the ear of an animal and the tag then bent into a substantially annular shape. The applicator tool has engagement means for engaging with the tag and being operable to force the portion of the tag through the ear of an animal and then bend the tag into a substantially annular shape. The applicator tool is characterized by an ear support surface which is substantially normal to the line of movement of the portion of the tag as the portion of the tag engages with and passes at least part way through the ear.

10 Claims, 3 Drawing Sheets

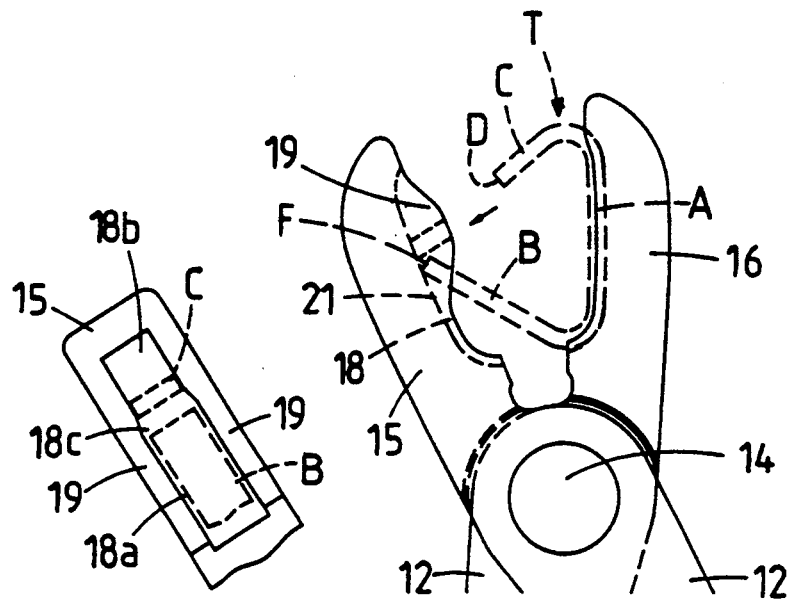
FIG. 2.
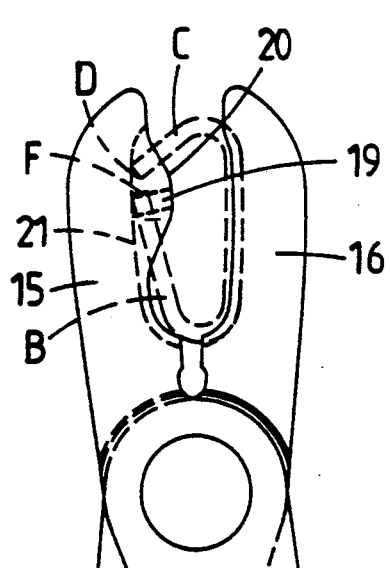
FIG. 3.
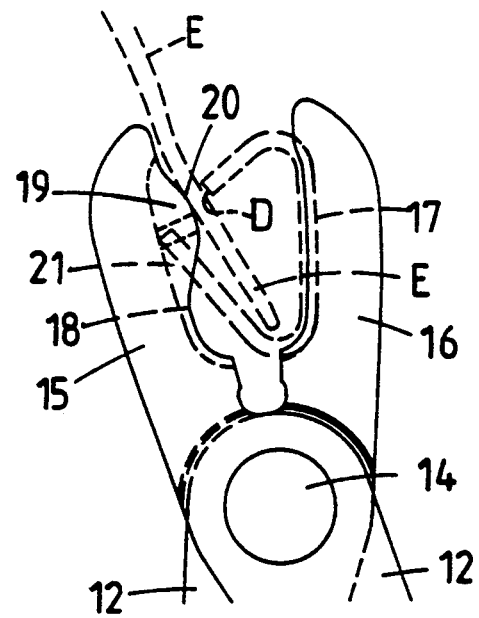
FIG. 4.
FIG. 5.

EAR TAG APPLICATOR

This invention relates to an ear tag applicator tool.

The most convenient means of applying an ear tag to the ear of an animal is in a one shot operation whereby an applicator tool causes an opening to be formed in the animal's ear and engages a part of the ear tag through the opening. The opening can be formed by either forcing a part of the tag through the ear or cutting an opening and then drawing a part of the tag through the thus formed opening.

It is believed that in order to avoid undue damage to the animal's ear and assist the healing process of the wound formed in the ear it is preferable to cut a clean opening in the ear. Thus, for example in our U.S. Pat. No. 4,653,208 we have proposed a two piece tag having a cutting edge on the male component which co-operates with the female opening during application of the tag to form a clean opening.

One form of tag which is in widespread use is a one piece metal, more particularly brass, tag which is applied to the animal's ear by a portion of the tag being engaged through an opening in the animal's ear whereupon the tag is "closed" so as to effectively form a closed annular shape. Originally such tags were installed by an operator pre-punching the ear with a punch tool and then threading the tag through the opening. The tag was then closed by hand or by use of a suitable tool. There has, however, been developed pliers type applicator tools which force the portion of the tag through the ear and then effectively crimp the tag closed. Such tools, however, do not form or cause to be formed a clean cut or opening in the ear.

Broadly the present invention provides an ear tag applicator tool for applying a tag of the type having a portion which is able to be passed through an opening in the animal's ear and the tag then bent into a substantially annular shape, the ear tag applicator tool having engagement means for engaging with the tag and being operable to force said portion of the tag through the animal's ear and then bend the tag into said annular shape, said applicator tool being characterized by an ear support surface which is substantially normal to the line of movement of said portion of the tag as the tag engages with and passes at least part way through the ear.

Figure 6:
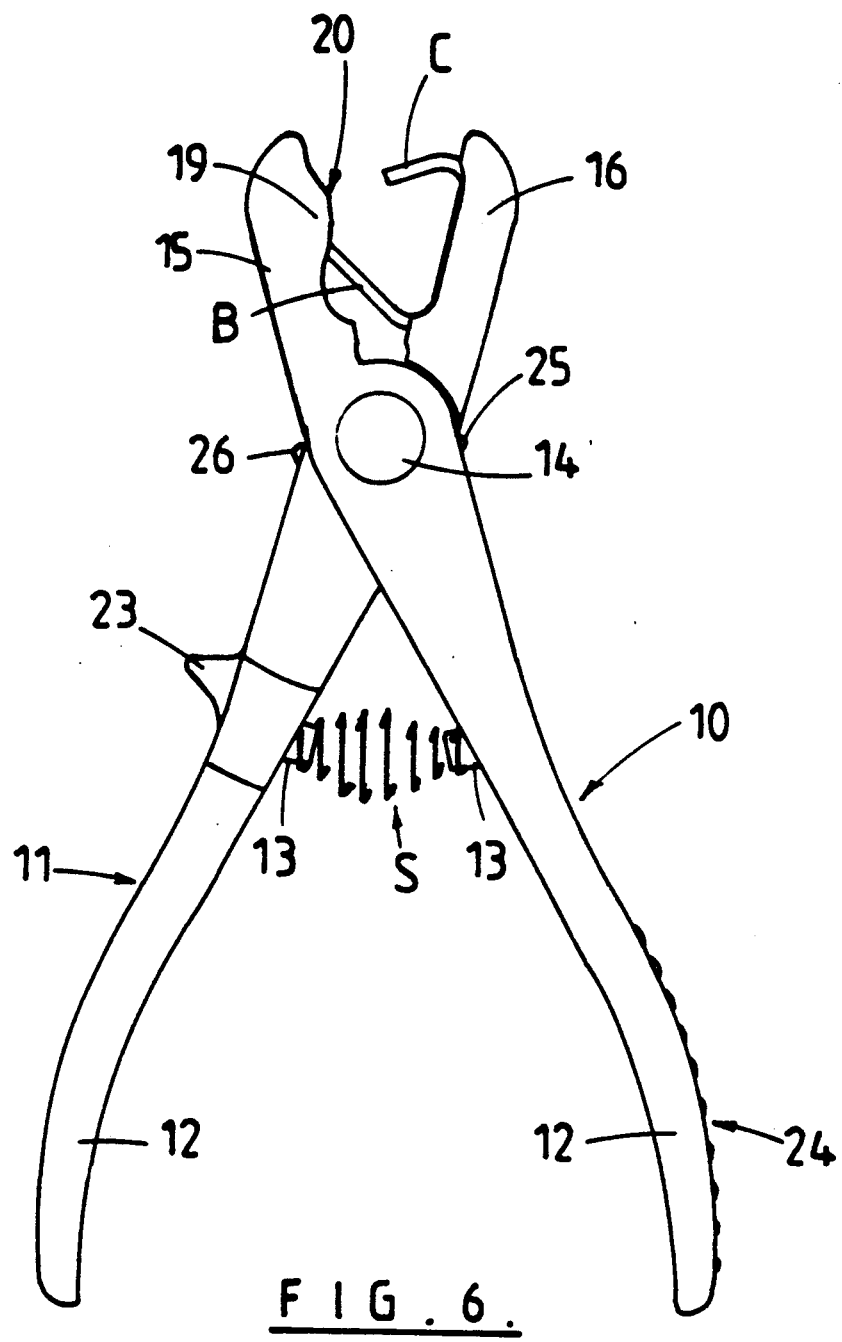

In the following description of a preferred form of the applicator tool according to the present invention reference will be made to the accompanying drawings in which:

FIG. 1 is an elevation view of the applicator tool with the jaws thereof in the "closed" position, FIG. 2 is a partial elevational view of the applicator tool with the jaws in an open position and a tag (shown in dotted detail) installed between the jaws, FIG. 3 is a partial plan view of one of the jaws of the applicator, FIG. 4 is a view similar to FIG. 2 but with the jaws partially closed and an ear of an animal (shown in dotted detail) engaged between the jaws, FIG. 5 is a further view showing the jaws approaching their fully closed position, and FIG. 6 is an elevation view of a second form of the applicator with the jaws in an "open" position.

The applicator tool of the present invention is more particularly shown (see FIGS. 2, 4 and 5) in conjunction with a one piece brass tag of a type which is sold under the FARM-ACY trade mark. The tag T is, in its open position, generally of V shape formed by two legs A and B with leg A carrying at its outer end a return portion C. When the tag has been installed in the animal's ear it has been deformed in a controlled manner by the applicator tool so that ends D and F of leg B and return C substantially abut end to end. The tag T thus takes up a "closed" configuration of substantially annular shape and is thereby prevented from being removed from the animal's ear unless it is "opened" by the ends D and F being moved apart.

The applicator tool as illustrated in the drawings comprises a pair of levers 10 and 11 which form toward one end a pair of handles 12. The handles pivot about a pivot 14 and are normally urged into an open position by the presence of a suitable spring S (shown in FIG. 6). In FIG. 1 of the drawings the tool is shown in the closed position with the handles 12 and jaws 15 and 16 (of levers 10 and 11 respectively) at their closest approach as determined by the inter-engagement of stops 13. FIG. 6 shows the tool in an open position prior to receiving a tag.

Jaw 16 is provided with an elongate recess 17 into which the leg A of tag T can be engaged (see FIG. 2). Likewise in jaw 15 a recess 18 is formed and end F of leg B locates therein (once again see FIG. 2). With the tag T installed as shown in FIG. 2 the applicator is ready for application of the tag to an animal's ear.

In FIG. 6 spring S (which is anchored at each end to the stops 13) is in a neutral position, i.e. the jaws are neither urged toward or away from one another. The jaws are thus held at a correct spacing for a tag T to be inserted. However, as the tag is inserted the jaws move apart slightly and the spring goes into tension. This serves to hold the tag in position with the result that the user can put the loaded tool on a resting placing without the tag falling from the jaws.

The side edges of recess 18 are in large part defined by walls 19. Recess 18 is basically formed by a main portion 18a which has a width wider than the width of arm B of tag T. The recess narrows through an intermediate portion 18c into a narrower portion 18b this portion 18b having a width just slightly greater than the width of return C of tag T.

Walls 19 are profiled at the uppermost edges to provide a support surface 20 in the vicinity of the line of movement of return C as jaws 15 and 16 are moved together. Thus support surface 20, which provides a surface against which ear E of the animal engages, is at substantially right angles to the direction of movement of return C (see FIG. 4). Therefore as return C moves into engagement and at least partially through ear E the ear is supported substantially normal to the length of return C.

Consequently leading end D, support surfaces 20 and the recess 18b effectively form a punch and anvil arrangement. This results in a cutting action on the animal's ear taking place rather than a simple puncturing action.

In FIG. 5 there is shown the relative positions of the jaws 15 and 16 and tag T once leading end D has penetrated through the animal's ear and come into contact with floor 21 of recess 18. It will be noted that as the jaws close leading end F of leg B slides along floor 21 to pass through the intermediate portion 18c and into the confines of portion 18b. As the jaws 15 and 16 close to their closest approach leg B and return C continue to be bent back toward leg A until they are substantially parallel to leg A with ends D and F substantially abuting. At this point the tag is of a generally closed annular shape and application of the tag has been completed.

The applicator tool can thus be moved relative to the tag to leave the tag in the animal's ear. As spring S is by now in compression the operator merely releases pressure from handles 12 and the spring pressure ensures that jaws 15 and 16 move apart to release therefrom the tag.

In a preferred form of the invention a stops 13 are provided to limit the travel of handles 12 toward one another and thereby limit the nip of jaws 15 and 16.

By having recess 18b of a width similar to the width of leg B and return C it is believed better control of the bending action of these parts will result. Therefore ends D and F will be guided into their correct abutting relationship.

It is believed that profiled support surface 20 will ensure that the line of action of return C is substantially normal to the surface of the animal's ear (at least at initial penetration) so that a good cutting action of the ear will result in a clean cut in the animal's ear rather than the undesirable jagged puncturing which results by use of known one shot applicator tools. It is therefore believed that by having an opening of this type formed in the animal's ear the wound is more likely to heal quickly and festering of the wound would largely be avoided. Beside causing discomfort to the animal any delay in the wound healing or actual festering of the wound can have an adverse effect on retention of the tag in the animal's ear. As the tag usually carries identification markings it is important that it be retained in the animal's ear to provide largely permanent identification of the animal.

In the commercial form of the tool as shown in FIG. 6 one handle 12 includes a projection 23 and the other handle 12 includes a ribbed surface 24, these both aiding grip of the tool in the user's hand. Also a clip (not shown) for holding the applicator in a closed position when the tool is not in use can be provided.

Finally it is beneficial to provide projections 25 and 26 on lever 10 and 11 in the vicinity of the pivot. These projections 25 and 26 engage with the lower edges of jaws 16 and 15 respectively to prevent over-opening of the jaws which would result in spring S being stretched beyond its maximum allowable tension to avoid permanent deformation of the spring.

What is claimed is:

1. In combination an ear tag and an applicator tool, said ear tag being of a type including first and second legs forming a substantially V shape and a return which projects from the distal end of said first leg toward the distal end of the second leg, the applicator tool including first and second jaw members, said first jaw member having tag engagement means with which said first leg is engaged, said second jaw member having an elongate recess in which the distal end of said second leg is engaged, said elongate recess being at least in part defined by a pair of spaced apart walls, said walls presenting a surface against which an ear of an animal can engage during application of the ear tag to the ear, said surfaces being substantially normal to the line of movement of said return as the return is, upon relative movement between the jaws, moved into engagement with the ear and passes at least part way through the ear.

2. The combination of claim 1 wherein said elongate recess includes first and second parts, said second part being of less width than said first part, the first and second parts being conjoined by an inwardly tapering intermediate part, the second part being located such that said return becomes engaged therein after having passed through said ear of the animal.

3. The combination of claim 2 wherein each said jaw is coupled to a lever means, said lever means being combined together by a pivot joint such that as the lever means are moved relatively together about said pivot the jaws are moved toward one another.

4. The combination of claim 2 wherein the width of the second part of the elongate recess is slightly greater than the width of the return of the tag and the distal end of the second leg of the tag.

5. An applicator tool for an ear tag for an animal ear, the ear tag being of the type including first and second legs forming a substantially V shape and a return which projects from the distal end of said first leg toward the distal end of the second leg, the applicator tool comprising:

first and second jaw members;

tag engagement means with said first jaw, the first leg of the ear tag when loaded into the applicator tool being engageable with said tag engagement means;

an elongate recess with said second jaw said recess having first and second parts which are conjoined by an intermediate part, said second part being of less width than the first part whereby when the ear tag is loaded into the applicator tool the distal end of the second leg is engageable in said first part and upon relative movement between the jaws, said distal end of the second leg is moved from the first part through the intermediate part and into the second part; and an ear engagement surface located to each side of the elongate recess, said surfaces being substantially normal to a line of movement defined by said return as the return is, upon relative movement between the jaws, moved into engagement with the ear and passes at least part way through the ear, said return after passing through the ear becoming located within said second part of the elongate recess.

6. An applicator tool as claimed in claim 5 wherein said elongate recess is at least in part defined by a pair of spaced apart walls, said walls providing said ear engagement surfaces.

7. An applicator tool as claimed in claim 5 or 6 wherein a width of said second part of the elongate recess is slightly greater than a width of the return of the tag and the distal end of the second leg of the tag.

8. An applicator tool as claimed in claim 7 comprising a pair of levers pivotally coupled together, the levers to one side of the pivot being formed as handles and to the other side of the pivot as said first and second jaws.

9. An applicator tool as claimed in claim 7 wherein said tag engagement means is formed by a shaped recess in which substantially a length of the first leg is engageable when the tag is loaded into the applicator tool.

10. An applicator tool as claimed in claim 7 wherein the intermediate part is inwardly tapered from the first part to the second part.

* * * * *